US009822244B2

(12) United States Patent
Joseph

(10) Patent No.: US 9,822,244 B2
(45) Date of Patent: Nov. 21, 2017

(54) OFF-ROAD TIRE TREAD

(75) Inventor: Aurelie Joseph, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 267 days.

(21) Appl. No.: 14/343,958

(22) PCT Filed: Sep. 11, 2012

(86) PCT No.: PCT/EP2012/067685
§ 371 (c)(1),
(2), (4) Date: Mar. 31, 2014

(87) PCT Pub. No.: WO2013/041400
PCT Pub. Date: Mar. 28, 2013

(65) Prior Publication Data
US 2014/0221557 A1  Aug. 7, 2014

(30) Foreign Application Priority Data
Sep. 19, 2011 (FR) ...................... 11 58303

(51) Int. Cl.
*C08L 7/00* (2006.01)
*B60C 1/00* (2006.01)
*C08L 9/00* (2006.01)

(52) U.S. Cl.
CPC ............. *C08L 7/00* (2013.01); *B60C 1/0016* (2013.01); *C08L 9/00* (2013.01); *B60C 2200/065* (2013.01)

(58) Field of Classification Search
CPC ... B60C 1/0016; B60C 2200/065; C08L 7/00; C08L 9/00
USPC ...................................................... 524/526
See application file for complete search history.

(56) References Cited

U.S. PATENT DOCUMENTS

| | | | |
|---|---|---|---|
| 3,715,370 A * | 2/1973 | Wilkus et al. ................. 549/214 |
| 3,937,681 A * | 2/1976 | Nordsiek ....................... 524/571 |
| 4,259,218 A * | 3/1981 | Haws .............................. 524/526 |
| 4,261,758 A * | 4/1981 | Wright et al. ............ 106/287.12 |
| 4,321,168 A | 3/1982 | Ueda et al. |
| 4,550,135 A * | 10/1985 | Iwama et al. ................. 524/495 |
| 4,929,679 A * | 5/1990 | Akita et al. .................... 525/194 |
| 5,115,006 A * | 5/1992 | Watanabe et al. ............ 524/251 |
| 5,420,193 A | 5/1995 | Matsue et al. |
| 5,686,530 A * | 11/1997 | Halasa et al. .................... 525/99 |
| 6,156,822 A * | 12/2000 | Materne ...................... C08J 3/20 152/151 |
| 6,313,220 B1 * | 11/2001 | Materne .................... B60C 1/00 524/266 |
| 6,429,245 B1 | 8/2002 | Francik et al. |
| 2004/0259997 A1 * | 12/2004 | Enjalbert ................. C08K 3/22 524/430 |
| 2006/0030658 A1 * | 2/2006 | Sandstrom ............ B60C 1/0025 524/492 |
| 2008/0149238 A1 * | 6/2008 | Kleckner .............. B60C 1/0016 152/209.1 |
| 2010/0099796 A1 * | 4/2010 | Lopitaux et al. ............. 523/156 |
| 2011/0003932 A1 | 1/2011 | Steinhauser et al. |

FOREIGN PATENT DOCUMENTS

| | | | |
|---|---|---|---|
| DE | 102007044175 | 3/2009 | |
| EP | 2007314649 | 12/2007 | |
| EP | 905185 | 11/2011 | |
| JP | S48-072241 | 9/1973 | |
| JP | S57119938 A | 7/1982 | |
| JP | H08-302072 A | 11/1996 | |
| JP | H10-25369 A | 1/1998 | |
| JP | 2011140532 | 7/2011 | |
| WO | WO 2009034001 | * 3/2009 | .............. C08L 19/00 |

OTHER PUBLICATIONS

Database WPI 200804 Thomson Scientific, London, GG: AN 2008-A54773 XP002557630, & XP002557630, & JP 2007 314649 A (Yokohama Rubber Co Ltd) Dec. 6, 2007 (Dec. 6, 2007).
Database WPI 201149 Thomson Scientific, London, GG: AN 2011-J34940 XP002667532, & JP 2011 140532 A (Sumimoto Rubber Ind Ltd) Jul. 21, 2011 (Jul. 21, 2011).
International Search Report for PCT/EP2012/067685 dated Oct. 26, 2012.
Jul. 21, 2016, Office Action issued by the Japanese Patent Office in related application No. 2014-531169.
Partial translation of Jul. 21, 2016, Office Action issued by the Japanese Patent Office in related application No. 2014-531169.

* cited by examiner

*Primary Examiner* — Alexander Kollias
(74) *Attorney, Agent, or Firm* — Dickinson Wright PLLC

(57) ABSTRACT

The invention relates to an off-road tire comprising a composition based on at least one filler, a crosslinking system, from 50 to 80 parts by weight, per hundred parts by weight of elastomer (phr), of at least one isoprene elastomer and from 20 to 50 phr of at least one polybutadiene having a high vinyl content, the total content of isoprene elastomer and of polybutadiene having a high vinyl content being within a range varying from 85 to 100 phr.

15 Claims, No Drawings

OFF-ROAD TIRE TREAD

This application is a 371 of PCT/EP2012/067685, filed 11 Sep. 2012, which claims benefit under 35 U.S.C. §119 of the filing date of French patent application 1158303, filed 19 Sep. 2011, the entire contents of which is incorporated herein by reference for all purposes.

BACKGROUND

1. Field

Disclosed herein are off-road tires, in particular civil engineering tires, and their treads. These tires have to have very different technical characteristics from the tires intended for vehicles running on road (that is to say, a bituminous surface), as the nature of the ground on which they are moving is very different and in particular much more aggressive, due to its stony nature. Furthermore, in contrast to passenger vehicle tires, for example, in particular for large civil engineering vehicles, the tires have to be able to withstand a load which can be extremely heavy. Consequently, the solutions known for tires running on a bituminous surface are not directly applicable to off-road tires, such as civil engineering tires.

2. Description of Related Art

Today, the tread of off-road tires generally includes natural rubber, a reinforcing filler of carbon black type and additives normally used for these tires. The manufacturers of off-road tyres are seeking to improve the wear resistance of these tyres and thus their lifetime, without bringing about an increase in the hysteresis. It is possible to use synthetic elastomers as replacement for natural rubber. Such synthetic elastomers bring about an increase in the stiffness of the composition of the tread of the tire, which is unfortunately generally accompanied, for tires running on a non-bituminous or soft surface, of the type of those encountered on the work sites of civil engineering vehicles, by an increase in the hysteresis and thus in the internal temperature of the tire during working. The use of synthetic elastomers in the compositions of treads of off-road tires is thus limited by the increase in the hysteresis, in particular in the case of large-sized tires.

An increase in the stiffness of the composition of the tread of the tire might also be obtained by the use of finer reinforcing fillers or by increasing the content of reinforcing fillers. Unfortunately, this solution brings about, in particular for off-road tires having very large sizes, an increase in the hysteresis and thus does not make it possible to solve the problem set out above.

SUMMARY

Subsequent to their research studies, the Applicant Companies have found that a specific composition for the tread of off-road tires makes it possible to solve this problem and to obtain an improved wear resistance without damaging the hysteresis.

Thus, an embodiment disclosed herein relates to an off-road tire tread comprising a composition based on at least one filler, a crosslinking system, from 50 to 80 parts by weight, per hundred parts by weight of elastomer (phr), of at least one isoprene elastomer and from 20 to 50 phr of at least one polybutadiene having a high vinyl content, the total content of isoprene elastomer and of polybutadiene having a high vinyl content being within a range varying from 85 to 100 phr.

Preferably, an embodiment relates to a tread as defined above in which the polybutadiene having a high vinyl content comprises a vinyl content within a range extending from 55% to 95%, more preferably from 60% to 90%.

Preferably again, an embodiment relates to a tread as defined above in which the total content of isoprene elastomer and of polybutadiene having a high vinyl content is within a range varying from 90 to 100 phr, preferably from 95 to 100 phr and more preferably of 100 phr.

Preferably, an embodiment relates to a tread as defined above in which the content of isoprene elastomer is within a range extending from 50 to 70 phr.

Preferably, an embodiment relates to a tread as defined above in which the isoprene elastomer predominantly comprises natural rubber.

Alternatively, an embodiment relates to a tread as defined above in which the isoprene elastomer predominantly comprises synthetic polyisoprene.

Preferably, an embodiment relates to a tread as defined above in which the content of polybutadiene having a high vinyl content is within a range extending from 30 to 50 phr.

More preferably, an embodiment relates to a tread as defined above in which the filler is a reinforcing filler chosen from carbon black, silica and their mixtures, preferably at a content within a range varying from 30 to 90 phr, preferably from 30 to 80 phr.

Preferably again, an embodiment relates to a tread as defined above additionally comprising a non-reinforcing filler, which can preferably be chosen from chalk, graphite, glass flakes or silicon-based lamellar fillers, such as smectites, kaolin, talc, mica, montmorillonites, vermiculite, non-bonded silica and a mixture of the latter.

More preferably, an embodiment relates to a tread as defined above in which the non-reinforcing filler is non-bonded silica.

Preferably, an embodiment relates to a tread as defined above in which the content of non-reinforcing filler is within a range extending from 2 to 35 phr, preferably from 3 to 25 phr.

An embodiment also relates to an off-road tire comprising a tread as described above and preferably it is a civil engineering tyre.

DETAILED DESCRIPTION OF SPECIAL EMBODIMENTS

The subject matter of the invention is thus an off-road tire tread comprising a composition based on at least one (that is to say, one or more) filler, a crosslinking system, from 50 to 80 parts by weight, per hundred parts by weight of elastomer (phr), of at least one isoprene elastomer (that is to say, one or more, the content shown being the total content if the composition comprises several isoprene elastomers) and from 20 to 50 phr of at least one polybutadiene having a high vinyl content (that is to say, one or more, the content shown being the total content if the composition comprises several of these polybutadienes), the total content of isoprene elastomer and of polybutadiene having a high vinyl content being within a range varying from 85 to 100 phr.

The expression "composition based on" should be understood as meaning a composition comprising the mixture and/or the product of the in situ reaction of the various base constituents used, it being possible for some of these constituents to react and/or some of these constituents being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

Equivalently, an embodiment of the invention preferably relates to a composition as defined above in which the composition is in the non-crosslinked state or in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

According to embodiments disclosed herein, the off-road tire denotes a tire intended to equip, in particular for vehicles for civil engineering works carrying very heavy loads. These vehicles can be site plant, dumpers or vehicles for opencast or underground mines. These tires normally have diameters which can vary from 1 to 4 meters, and are inflated to a working pressure of greater than 4 bar, in particular of greater than 6 bar, for example from 4 to 10 bar. Vehicles of civil engineering works are equipped with tires which are generally subject to very high loads and to very high variations in load. These tires are provided with treads which exhibit, in comparison with the thicknesses of the treads of the other types of tires, such as, for example, the tires for heavy-duty vehicles, great thicknesses of rubber material. The term "great thickness" is understood here to mean a thickness of greater than 30 mm which can range up to a value of 120 mm. Consequently, the effect of the running cycles and of the cycles of variations in load withstood bring about high temperatures in the treads of these tires, in particular in the central part of the treads.

I-1 Elastomer or Rubber

As is customary, the terms "elastomer" and "rubber", which are interchangeable, are used without distinction in the text.

The tire tread according to embodiments disclosed herein comprises, as predominant elastomer, at a content within a range extending from 50 to 80 phr and preferably from 50 to 70 phr, at least one (that is to say, one or more) isoprene elastomer which is natural (natural rubber, NR), synthetic (IR) or a mixture of the two. Isoprene elastomers are well known to a person skilled in the art. According to one embodiment, which is preferred, the isoprene elastomer predominantly (that is to say, more than 50% by weight) comprises natural rubber and preferably solely natural rubber. According to another embodiment, the isoprene elastomer predominantly comprises synthetic polyisoprene and preferably solely synthetic polyisoprene.

In addition to the isoprene elastomer(s), that is to say at a content within a range extending from 20 to 50 phr, the tread of the tire according to embodiments disclosed herein also comprises a polybutadiene having a high vinyl content. Preferably, the content of polybutadiene having a high vinyl content is within a range extending from 30 to 50 phr. The term "polybutadiene having a high vinyl content" is understood to mean any polybutadiene having a content (mol %) of units described as "1,2-units" (or vinyl units) of between 50% and 100%, preferably within a range extending from 55% to 95%, more preferably from 60% to 90%, and in particular those having a content (mol %) of 1,2-units of between 65% and 85%. Preferably again, for the requirements of the embodiments disclosed herein, the choice will be made of a polybutadiene having a vinyl content of greater than 60%, preferably of greater than 65% and in particular within a range extending from 70% to 90%. Such polybutadienes are known to a person skilled in the art and have been described in the document GB-1 166 832, for example. The polybutadienes having a high vinyl content of use for the requirements of the embodiments disclosed herein can comprise, as synthesis residues, a small amount of monomers other than butadiene, such as, for example, styrene. These residues due to the manufacturing process, if they are present, do not exceed a maximum amount of 10% (preferably 5% and more preferably 3%) within the polybutadiene having a high vinyl content as described above.

The total content of isoprene elastomer and of polybutadiene having a high vinyl content is within a range varying from 85 to 100 phr, preferably from 90 to 100 phr and more preferably from 95 to 100 phr. In particular, the composition can preferably comprise only isoprene elastomer(s) and polybutadiene having a high vinyl content.

When an additional elastomer is present in the composition of the tire of the invention, this elastomer can be chosen from any elastomer known to a person skilled in the art. By way of example, the additional elastomer can be a diene rubber of the type of those commonly used in tires, such as, for example, polybutadiene, styrene/butadiene copolymers and others.

When an additional elastomer is present in the composition, its content is at most 15 phr, preferably at most 10 phr and more preferably at most 5 phr. More preferably, the composition does not comprise additional elastomer.

I-2 Filler

Use may be made of any type of filler in the formulations of treads of tires according to embodiments disclosed herein, such as reinforcing or non-reinforcing fillers. Mention may be made, among reinforcing fillers known for their abilities to reinforce a rubber composition which can be used for the manufacture of tires, for example, of an organic filler, such as carbon black, a reinforcing inorganic filler, such as silica in the presence of a coupling agent, or also a blend of these two types of filler, in particular a blend of carbon black and silica.

All carbon blacks, in particular blacks of the HAF, ISAF or SAF type, conventionally used in tires ("tire-grade" blacks), are suitable. Mention will more particularly be made, among the latter, of reinforcing carbon blacks, such as the blacks of the 100 or 200 series (ASTM grades), such as, for example, the N115, N134, N220 or N234 blacks, or else, depending on the applications targeted, the blacks of higher series from 300 to 900 (for example, N326, N330, N339, N347, N375, N550, N650, N660, N683, N772 or N990). The carbon blacks might, for example, be already incorporated in the elastomer in the form of a masterbatch (see, for example, Applications WO 97/36724 or WO 99/16600). For the requirements of the invention, "fine" blacks are preferred, such as, for example, the N115, N134, N220 or N234 blacks.

Mention may be made, as examples of organic fillers other than carbon blacks, of functionalized polyvinylaromatic organic fillers, such as described in Applications WO-A-2006/069792 and WO-A-2006/069793.

"Reinforcing inorganic filler" should be understood, in the present patent application, by definition, as meaning any inorganic or mineral filler, whatever its colour and its origin (natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention may be made, as example of silica of use for the requirements of embodiments of the invention, of the "Ultrasil VN3SP" silica sold by Evonik. Mention will be made, as highly dispersible precipitated silicas (HDSs), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

When silica is used as reinforcing filler in the composition, use may be made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

When the rubber compositions in accordance with embodiments of the invention comprise coupling agents, in a known manner, their content is adjusted according to the silica content; it is preferably within a range extending from 0.1 to 10 phr, more preferably from 0.2 to 8 phr and more preferably still from 0.5 to 5 phr.

A person skilled in the art understands that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

A person skilled in the art knows how to adjust the total content of total reinforcing filler (carbon black and reinforcing inorganic filler, such as silica) as a function, on the one hand, of the specific surface of the reinforcing filler and, on the other hand, according to the specific applications targeted. Preferably, this content is within a range extending from 30 to 90 phr, preferably from 30 to 80 phr and more preferably from 35 to 70 phr. According to a specific form, the reinforcing filler predominantly comprises, by weight, carbon black, that is to say that it represents the highest content by phr among the reinforcing fillers of the composition; preferably, the carbon black represents more than 50% of the reinforcing filler, for example at a content within a range varying from 30 to 90 phr, preferably from 30 to 80 phr and more preferably from 35 to 70 phr.

Optionally, the compositions of embodiments of the invention can also comprise an inert or non-reinforcing filler. Unlike the reinforcing fillers, of nanometric size, the non-reinforcing fillers are generally of micrometric size; these are microparticles. For example, these inert fillers can be chosen from lamellar or non-lamellar fillers, such as chalk, graphite, glass flakes or silicon-based lamellar fillers, such as smectites, kaolin, talc, mica, montmorillonites and vermiculite, or a mixture of the latter.

The nanometric fillers which do not bond to the elastomeric matrix, such as silica in the absence of coupling agent (reference is then made to "non-bonded silica"), are also regarded as non-reinforcing fillers. Preferably, in the compositions of the treads of the tires according to embodiments disclosed herein, non-bonded silica is found as "non-reinforcing" filler. This non-bonded silica can be used with a covering agent different from a coupling agent, such as, for example, a polyethylene glycol (PEG), well-known to a person skilled in the art.

When fillers of non-reinforcing type are present in the composition, their total content can preferably vary from 2 phr to 35 phr, preferably from 3 to 25 phr and in particular from 5 to 20 phr.

Thus, for example, the composition can comprise silica as reinforcing and/or non-reinforcing filler according to the presence and the amount of coupling agent. For example, a portion of the silica present can be reinforcing, when it is bonded to the elastomer via a coupling agent, and another portion of the silica can be non-reinforcing, when it is not bonded to the elastomer via a coupling agent.

I-3 Crosslinking System

Crosslinking system is understood to mean the chemical agent (or chemical agents) introduced during the "productive" phase of the preparation of the compositions (see section on the preparation of the compositions). This chemical agent allows the elastomer chains to bond to one another with the formation of a three-dimensional network; this is the phenomenon of crosslinking.

Usually, for the crosslinking of the compositions of treads of tires, use is made of sulphur or a sulphur-donating agent and of a primary vulcanization accelerator; reference is then made to vulcanization. The sulphur or sulphur-donating agent is used at a preferred content of between 0.5 and 10 phr, more preferably of between 0.5 and 5.0 phr, for example between 0.5 and 3.0 phr. The primary vulcanization accelerator is used at a preferred content of between 0.2 and 10 phr, more preferably of between 0.3 and 6.0 phr. Additional to this vulcanization system are optionally various known secondary vulcanization accelerators or vulcanization activators, preferably each for 0.5 to 5.0 phr.

Use may be made of accelerators of the thiazole type and also their derivatives, accelerators of thiuram, carbamate and sulphenamide types. These accelerators are, for example, selected from the group consisting of 2-mercaptobenzothiazyl disulphide (abbreviated to "MBTS"), tetrabenzylthiuram disulphide (TBzTD), N-cyclohexyl-2-benzothiazolesulphenamide (CBS), N,N-dicyclohexyl-2-benzothiazolesulphenamide (DCBS), N-(tert-butyl)-2-benzothiazolesulphenamide (TBBS), N-(tert-butyl)-2-benzothiazolesulphenimide (TBSI), zinc dibenzyldithiocarbamate (ZBEC) and the mixtures of these compounds. Mention may also be made, among vulcanization accelerators/activators, of fatty acids, such as stearic acid, or guanidine derivatives (in particular diphenylguanidine).

I-4 Various Additives:

The tread compositions in accordance with embodiments of the invention can also comprise all or a portion of the usual additives generally used in elastomer compositions intended for the manufacture of tires, in particular of airtight layers, such as, for example, protection agents, such as anti-ozone waxes, chemical anti-ozonants or antioxidants, anti-fatigue agents, reinforcing resins, methylene acceptors (for example, phenolic novolak resin) or methylene donors (for example, HMT or H3M), such as described, for example, in Application WO 02/10269. For example, the compositions can comprise protection agents, such as paraffin wax and/or N-(1,3-dimethylbutyl)-N-phenyl-para-phenylenediamine (6-PPD).

The tread compositions according to embodiments disclosed herein can additionally comprise a plasticizing agent of the type of those normally used, such as oils or resins. Preferably, these tread compositions comprise, as preferred non-aromatic or very weakly aromatic plasticizing agent, at least one compound selected from the group consisting of naphthenic oils, paraffinic oils, MES oils, TDAE oils, glycerol esters (in particular trioleates), plasticizing hydrocarbon resins exhibiting a high Tg preferably of greater than 30° C., and mixtures of such compounds.

These compositions can also comprise, in addition to the coupling agents, coupling activators, covering agents for the reinforcing inorganic filler or more generally processing aids capable, in a known way, by virtue of an improvement in the dispersion of the inorganic filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

II-Preparation of the Compositions

The compositions are manufactured in appropriate mixers, using two successive phases of preparation: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing a tread composition for off-road tires comprises the following stages:

incorporating, in the elastomers, during a first stage, at least one filler, everything being kneaded thermomechanically, in one or more goes, until a maximum temperature of between 110° C. and 190° C. is reached (this preparation phase is known as "non-productive" phase);

subsequently incorporating, during a second stage, the crosslinking system and kneading everything up to a maximum temperature of less than 110° C. (this preparation phase is known as "productive" phase).

These two stages can be carried out consecutively on one and the same mixer or can be separated by a stage of cooling to a temperature of less than 100° C., the final stage then being carried out on a second mixer.

By way of example, the non-productive phase is carried out in a single thermomechanical stage during which, in a first step, all the necessary base constituents (elastomer, filler and optional processing aids) are introduced into an appropriate mixer, such as a standard internal mixer, followed, in a second step, for example after kneading for one to two minutes, by the other additives, optional additional covering agents or processing aids, with the exception of the cross-linking system. After cooling the mixture thus obtained, the crosslinking system is then incorporated in an external mixer, such as an open mill, maintained at a low temperature mixer (for example between 40° C. and 100° C.). The combined mixture is then mixed (productive phase) for a few minutes, for example between 2 and 15 min.

The final composition thus obtained is subsequently calendered, for example in the form of a sheet or plaque, in particular for laboratory characterization, or else extruded in the form of a rubber profiled element which can be used as civil engineering tire tread.

The crosslinking (or vulcanization, or curing) is carried out at a temperature generally of between 110° C. and 200° C., for a sufficient time which can vary, for example, between 5 and 500 min, as a function in particular of the curing temperature, of the vulcanization system adopted and of the kinetics of crosslinking of the composition under consideration.

An embodiment relates to the rubber layers described above, both in the "raw" state (i.e., before curing) and in the "cured" or vulcanized state (i.e., after vulcanization).

An embodiment also relates to the preparation process as described above. The embodiment preferably relates to a process as defined above in which, between the thermomechanical kneading and the incorporation of the crosslinking system, the combined product is cooled to a temperature of less than or equal to 100° C.

III-Examples

III-1 Characterization of the Rubber Compositions

Shearing Dynamic Properties

The dynamic properties are measured on a viscosity analyser (Metravib VA4000) according to Standard ASTM D 5992-96. The response of a sample of vulcanized composition (cylindrical test specimen with a height of 4 mm and with a cross section of 400 mm$^2$), subjected to a simple alternating sinusoidal shear stress, at a frequency of 10 Hz, at 60° C. and at 100° C., is recorded. A strain amplitude sweep is carried out from 0.1% to 100% (outward cycle) and then from 100% to 0.1% (return cycle). The results made use of are the complex dynamic shear modulus G* and the loss factor tan(δ). The value of the G* at 50% strain and also the loss factor, denoted tan(δ)$_{max}$, are recorded on the return cycle.

For greater readability, the results will be shown in base 100, the value 100 being assigned to the control. A result of less than 100 will indicate a decrease in the value concerned and, conversely, a result of greater than 100 will indicate an increase in the value concerned.

III-2 Examples of Compositions

The examples presented below are prepared as shown above; their compositions are given in Table 1, in phr.

TABLE 1

| Composition | C1 | C2 |
|---|---|---|
| NR (1) | 100 | 60 |
| HVBR (2) | 0 | 40 |
| Silica (3) | 15 | 15 |

TABLE 1-continued

| Composition | C1 | C2 |
|---|---|---|
| Carbon black (4) | 40 | 40 |
| Antioxidant (5) | 1.5 | 1.5 |
| Processing aid (6) | 2 | 2 |
| ZnO | 3 | 3 |
| Stearic acid | 1 | 1 |
| Sulphur | 1.9 | 1.9 |
| Accelerator | 1.2 | 1.2 |

(1) Natural rubber
(2) Polyisobutylene having a high vinyl content (vinyl content of 75%), Europrene BR HV 80, sold by Polimeri Europa
(3) Ultrasil VN3SP silica, sold by Evonik
(4) N115, sold by Cabot Corporation
(5) N-(1,3-Dimethylbutyl)-N-phenyl-para-phenylenediamine, Santoflex 6-PPD from Flexsys
(6) Polyethylene glycol, Carbowax 8000 from Dow Corning Composition C1 is the control composition; it comprises solely natural rubber. Composition C2 in accordance with the invention comprises a blend of natural rubber and polybutadiene having a high vinyl content. They thus vary from one another in the nature of the elastomers.

III-3 Properties of the Compositions

The properties of the compositions presented above are presented in Table 2 below.

TABLE 2

| Composition | C1 | C2 |
|---|---|---|
| $G^*$ at 50% at 100° C. Base 100 | 100 | 131 |
| $\tan(\delta)_{max}$ at 100° C. Base 100 | 100 | 94 |
| $G^*$ at 50% at 60° C. Base 100 | 100 | 125 |
| $\tan(\delta)_{max}$ at 60° C. Base 100 | 100 | 100 |

The comparison of compositions C1 and C2 shows that composition C2 has a stiffness increased by more than 20% ($G^*$ at 50% at 60° C. and 100° C.), without significant increase in the hysteresis ($\tan(\delta)$ at 60° C. and 100° C.).

Thus, by virtue of the composition of the treads of the tires according to embodiments of the invention, it is possible to improve the wear resistance without adversely affecting the hysteresis.

The invention claimed is:

1. An off-road tire tread comprising a composition based on at least one reinforcing filler comprising:
   carbon black;
   a non-reinforcing filler comprising non-bonded silica in an amount of 2 to 35 parts by weight per hundred parts by weight of elastomer (phr);
   a crosslinking system;
   from 50 to 80 phr of at least one isoprene elastomer; and
   from 20 to 50 phr of at least one polybutadiene having a high vinyl content;
   wherein the total content of the at least one isoprene elastomer and the at least one polybutadiene having a high vinyl content is from 90 to 100 phr;
   wherein the at least one polybutadiene having a high vinyl content is a homopolymer of 1,3-butadiene having a high vinyl content; and
   wherein the off-road tire tread is suitable for an off-road tire.

2. The off-road tire tread according to claim 1, wherein the at least one polybutadiene having a high vinyl content comprises a vinyl content within a range from 55% to 95%, based on the at least one polybutadiene having a high vinyl content.

3. The off-road tire tread according to claim 2, wherein the at least one polybutadiene having a high vinyl content comprises a vinyl content from 60% to 90%, based on the at least one polybutadiene having a high vinyl content.

4. The off-road tire tread according to claim 1, wherein the total content of the at least one isoprene elastomer and the at least one polybutadiene having a high vinyl content is 100 phr.

5. The off-road tire tread according to claim 1, wherein the content of the at least one isoprene elastomer is from 50 to 70 phr.

6. The off-road tire tread according to claim 1, wherein the at least one isoprene elastomer predominantly comprises natural rubber.

7. The off-road tire tread according to claim 1, wherein the at least one isoprene elastomer predominantly comprises synthetic polyisoprene.

8. The off-road tire tread according to claim 1, wherein the content of the at least one polybutadiene having a high vinyl content is from 30 to 50 phr.

9. The off-road tire tread according to claim 1, wherein the content of reinforcing filler is from 30 to 90 phr.

10. The off-road tire tread according to claim 1, wherein the non-reinforcing filler further comprises a filler selected from the group consisting of chalk, graphite, glass flakes, silicon-based lamellar fillers, kaolin, talc, mica, montmorillonites, vermiculite, and combinations thereof.

11. An off-road tire comprising the off-road tire tread according to claim 1.

12. The off-road tire according to claim 11, wherein the tire is a tire for a civil engineering vehicle.

13. The off-road tire tread according to claim 1, wherein the total content of the at least one isoprene elastomer and the at least one polybutadiene having a high vinyl content is from 95 to 100 phr.

14. The off-road tire tread according to claim 9, wherein the content of reinforcing filler is from 30 to 80 phr.

15. The off-road tire tread according to claim 1, wherein the content of non-reinforcing filler is from 3-25 phr.

* * * * *